(12) United States Patent
Tootaghaj et al.

(10) Patent No.: US 12,373,910 B2
(45) Date of Patent: Jul. 29, 2025

(54) SCHEDULING JOBS ON GRAPHICAL PROCESSING UNITS

(71) Applicant: Hewlett Packard Enterprise Development LP, Spring, TX (US)

(72) Inventors: Diman Zad Tootaghaj, Milpitas, CA (US); Junguk Cho, Milpitas, CA (US); Puneet Sharma, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 36 days.

(21) Appl. No.: 18/307,728

(22) Filed: Apr. 26, 2023

(65) Prior Publication Data
US 2024/0095870 A1 Mar. 21, 2024

Related U.S. Application Data

(63) Continuation of application No. 17/360,122, filed on Jun. 28, 2021, now Pat. No. 11,651,470.

(51) Int. Cl.
G06T 1/20 (2006.01)
(52) U.S. Cl.
CPC ..................... *G06T 1/20* (2013.01)
(58) Field of Classification Search
CPC ....................................................... G06T 1/20
See application file for complete search history.

(56) References Cited

U.S. PATENT DOCUMENTS

| 2013/0191612 | A1  | 7/2013  | Li et al. | |
|---|---|---|---|---|
| 2014/0215462 | A1* | 7/2014  | Kuo ....................... | G06F 9/505 718/1 |
| 2017/0132747 | A1* | 5/2017  | Wilt ........................ | G06F 9/445 |
| 2019/0347137 | A1* | 11/2019 | Sivaraman .......... | G06F 9/45558 |
| 2021/0049728 | A1* | 2/2021  | Ray ........................... | G06T 1/20 |
| 2021/0110089 | A1  | 4/2021  | Chen et al. | |
| 2021/0110506 | A1* | 4/2021  | Prakash ................. | G06F 9/505 |

(Continued)

FOREIGN PATENT DOCUMENTS

| CN | 109376009 A | 2/2019 |
|---|---|---|
| CN | 111506404 A | 8/2020 |
| CN | 111966500 A | 11/2020 |

OTHER PUBLICATIONS

A. Ferikoglou et al., "Resource Aware GPU Scheduling in Kubernetes Infrastructure," 2021, 12 pages.

(Continued)

*Primary Examiner* — Kee M Tung
*Assistant Examiner* — Khoa Vu
(74) *Attorney, Agent, or Firm* — Trop, Pruner & Hu, P.C.

(57) ABSTRACT

Example implementations relate to scheduling of jobs for a plurality of graphics processing units (GPUs) providing concurrent processing by a plurality of virtual GPUs. According to an example, a computing system including one or more GPUs receives a request to schedule a new job to be executed by the computing system. The new job is allocated to one or more vGPUs. Allocations of existing jobs are updated to one or more vGPUs. Operational cost of operating the one or more GPUs and migration cost of allocating the new job are minimized and allocations of the existing jobs on the one or more vGPUs is updated. The new job and the existing jobs are processed by the one or more GPUs in the computing system.

20 Claims, 5 Drawing Sheets

(56) References Cited

U.S. PATENT DOCUMENTS

| | | | |
|---|---|---|---|
| 2021/0117246 A1 | 4/2021 | Lal et al. | |
| 2022/0050714 A1* | 2/2022 | Grimshaw | G06F 9/4856 |
| 2022/0091874 A1* | 3/2022 | Janakiram | G06F 9/5088 |

OTHER PUBLICATIONS cnvrg.io, "Multi-Instance GPU Support for ML Workloads with cnvrg.io on NVIDIA A100," 2021, 3 pages, Retrieved from the Internet on Apr. 26, 2021 at URL: cnvrg.io/solutions/multi-instance-gpu/.

Deepomatic, "Fork of NVIDIA device plugin for Kubernetes with support for shared GPUs by declaring GPUs multiple times," GitHub, Mar. 24, 2021, 7 pages, Retrieved from Internet on May 21, 2021 at URL: github.com/Deepomatic/shared-gpu-nvidia-k8s-device-plugin.

Github, "Aliyun Container Service/ gpushare-device-plugin," 2019, 5 pages, Retrieved from the Internet on May 27, 2021 at URL: github.com/AliyunContainerService/gpushare-device-plugin.

Github, "NVIDIA/k8s-device-plugin: NVIDIA Device Plugin for Kubernetes," Feb. 26, 2021, 15 pages, Retrieved from the Internet on May 25, 2021 at URL: github.com/NVIDIA/k8s-device-plugin.

Google Developers, "Above OR-Tools," Mar. 16, 20206, 2 pages, Retrieved from Internet on May 30, 2021 at URL: developers.google.com/optimization/introduction/overview.

Gurobi Optimization, LLC, "Product Brochure," Jan. 2021, 10 pages.

IBM Corporation, "IBM ILOG CPLEX Optimization Studio," Jun. 2018, 4 pages.

NVIDIA, "Multi-Process Service," Jun. 2020, 28 pages, USA.

NVIDIA, "NVIDIA A100 Tensor Core GPU Architecture," Aug. 2020, 82 pages, USA.

NVIDIA, "NVIDIA Multi-Instance GPU and NVIDIA Virtual Compute Server," Technical Brief, Nov. 2020, 17 pages, USA.

P. Thinakaran et al., "Kube-Knots: Resource Harvesting through Dynamic Container Orchestration in GPU-based Datacenters," Sep. 26, 2019, 13 pages, IEEE.

Run:AI, "Kubernetes Scheduler for Deep Learning," 2021, 7 pages, Retrieved from the Internet on Apr. 26, 2021 at URL: run.ai/plalform/kubernetes-scheduler/.

Shaoqi Wang et al., "An Efficient and Non-Intrusive GPU Scheduling Framework for Deep Learning Training Systems," Nov. 2020, 13 pages, IEEE.

The Kubernetes Authors, "Schedule GPUs," Feb. 11, 2021, 4 pages, Retrieved from the Internet on Jun. 28, 2021 t URL: //kubernetes.io/docs/tasks/manage-gpus/scheduling-gpus/.

W. He and J. Shan, "Virtual GPU device plugin for inference workloads in Kubernetes," Oct. 22, 2020, 7 pages, Retrieved from the Internet on Apr. 20, 2021 at URL: aws.amazon.com/blogs/opensource/virtual-gpu-device-plugin-for-inference-workload-in-kubernetes/.

Wikipedia, "Integer Programming," May 24, 2021, 9 pages, Retrieved from Internet on May 30, 2021 at URL:/en.wikipedia.org/wiki/Integer_programming.

* cited by examiner

SCHEDULING JOBS ON GRAPHICAL PROCESSING UNITS

CROSS-REFERENCE TO RELATED APPLICATIONS

This application is a continuation application of and claims priority to application Ser. No. 17/360,122, filed on Jun. 28, 2021, the contents of which are hereby incorporated by reference in their entireties.

BACKGROUND

Some computing systems use graphics processing units (GPUs) to perform computations for applications. Some systems allow multiple applications to run concurrently on a single GPU.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
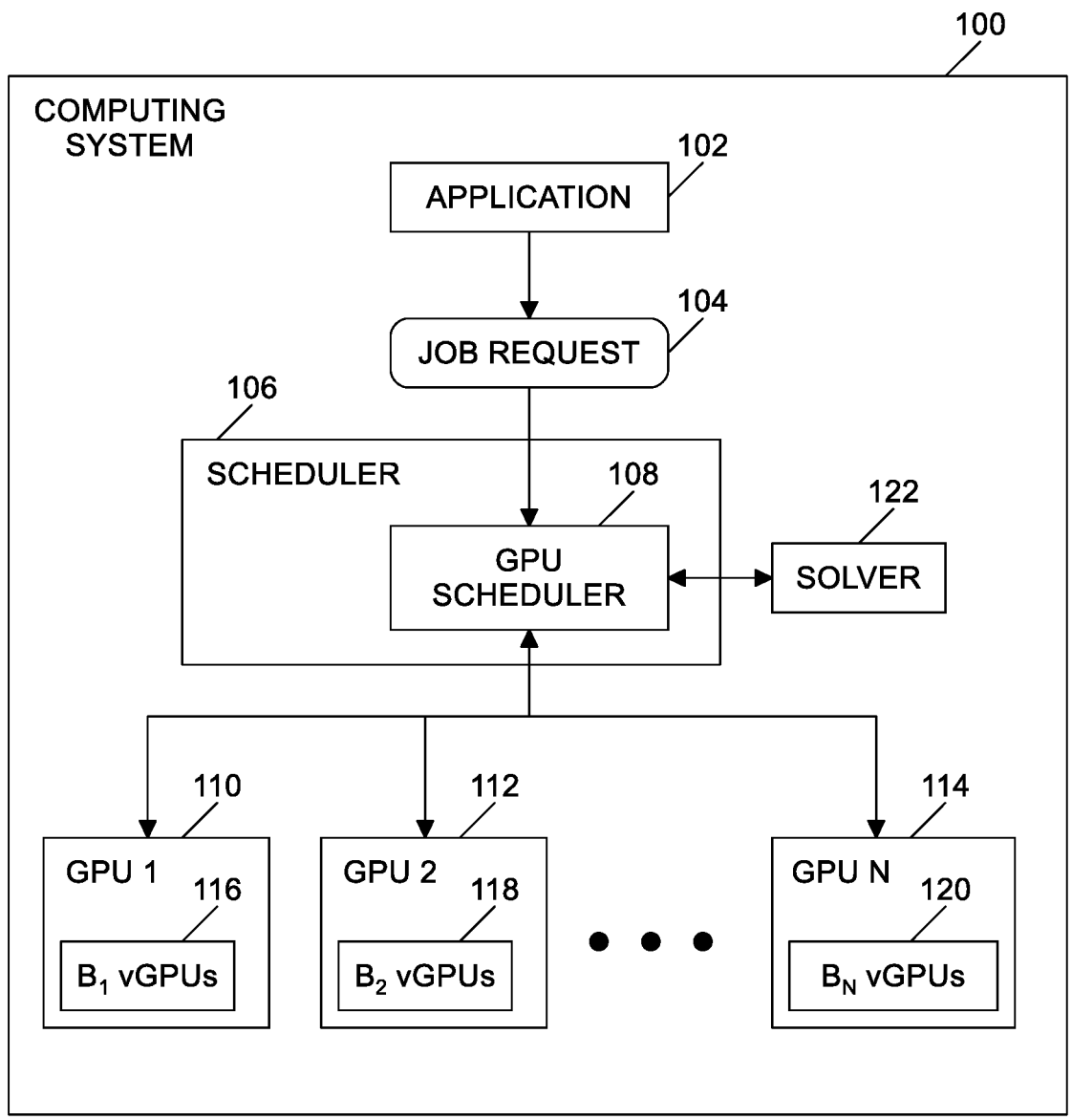
FIG. 1 is diagram of a computing system according to some embodiments.

In some GPUs, only one process (e.g., an application program) can use the GPU at a given time (e.g., through multiplexing techniques). Since GPU compute capability is typically underutilized by a single application, this may result in GPU resources going underutilized. Some GPUs overcome this problem by enabling multiple processes to be processed concurrently on the same GPU. This can provide better performance benefits. However, some container platforms typically only support a model of exclusive GPU assignment to one container or a time multiplexing approach to GPU sharing. This approach causes resource sharing inefficiency and performance degradation and does not consider efficiently sharing GPUs while scheduling applications that require GPU resources. Because existing GPU scheduling approaches either do not allow GPU sharing or use a simple first-come, first-served scheduler, better techniques for GPU scheduling are desired.

The technology described herein comprises a GPU scheduling process that allocates jobs to virtual GPUs (vGPUs) of GPUs in a computing system while minimizing GPU operational costs and job migration costs. The GPU scheduling process updates allocations of jobs to vGPUs (e.g., possibly resulting in migration of one or more jobs from one physical GPU to another physical GPU) whenever a new job request is received or when an existing job completes. The technology works on existing container platforms and can be configured to give priority to the migration cost or the operational cost depending on the selected use case. In an implementation, the GPU scheduling process is modeled as an integer linear programming optimization problem that may be solved optimally in polynomial time.

In the technical description herein, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

A "node" or "processing node" generally refers to a computing element. The nodes of a distributed system may be computer systems (e.g., clients, servers or peers) in virtual or physical form, one or more components of a computer system, computing elements, compute engines, hardware devices, software entities or processes, or a combination thereof. Non-limiting examples of nodes include a software process (e.g., a client or a server), a virtual machine, a virtual controller of a storage software stack, a storage server, a hyperconverged platform, a data virtualization platform, a sensor, or an actuator.

FIG. 1 is diagram of a computing system 100 according to some embodiments. Computing system 100 provides computing resources to one or more users. Computing system 100 may include one or more servers, storage devices, communications networks, network fabrics, interconnects, network interface cards, switches, routers, etc. In an implementation, computing system 100 is situated in a data center and coupled to other computing systems. In other implementations, computing system 100 may be any other type of computing device, such as a personal computer (desktop, laptop or workstation) or a mobile device. Computing system 100 includes at least one application 102 to perform data processing. Application 102 sends one or more job request(s) 104 to scheduler 106. A job, as used herein, is any data processing task. Scheduler 106 allocates the job to a processing resource in computing system 100 to perform the job. For example, a processing resource can be a central processing unit (CPU), a graphics processing unit (GPU), a field programmable gate array (FPGA), an application specific circuit (ASIC), etc. In various embodiments, scheduler 106 may be implemented in an operating system (OS) or may be implemented as a container orchestration system (e.g., Kubernetes).

Computing system 100 comprises one or more GPUs, where the one or more GPUs provide the capability of concurrent processing of a plurality of jobs by a plurality of vGPUs. In an embodiment, the GPUs are heterogeneous in computing system 100 (e.g., one or more of the GPUs are different than one or more other GPUs). For example, in an embodiment, one or more of the GPUs are produced by a first GPU manufacturer and one or more GPUs are produced by a second manufacturer, and the design of GPUs by the first manufacturer is different than the design of GPUs by the second manufacturer. In some cases, different ones of the GPUs may be different models produced by the same manufacturer. Embodiments provide efficient computation of allocation of jobs to GPUs regardless of GPU manufacturer or model type.

When application 102 is programmed to use a GPU to efficiently perform selected data processing tasks (such as certain tasks related to artificial intelligence (AI) computing, machine learning (ML), natural language processing (NLP), machine perception (including speech recognition, facial recognition, object recognition, etc.), neural networks, etc.), application 102 sends one or more job request(s) 104 to scheduler 106, and scheduler 106 instructs or cooperates with GPU scheduler 108 to allocate the job to a GPU to perform the job. Although GPU scheduler 108 is depicted within scheduler 106 in FIG. 1, GPU scheduler 108 may be implemented alongside or external to scheduler 106 in other implementations.

Example computing system 100 includes a plurality of GPUs, such as GPU 1 110, GPU 2 112, ... GPU N 114, where N is a natural number. In an implementation, a GPU comprises a plurality of virtual (vGPUs). A physical GPU can be divided into X vGPUs, where X is a natural number that is configurable. A vGPU enables multiple applications (for example, containerized applications) in computing system 100 to share a physical GPU or allocate multiple GPUs to a single application. For example, GPU 1 110 includes $B_1$ vGPUs 116, where $B_1$ is a natural number, GPU2 112 includes $B_2$ vGPUs 118, where $B_2$ is a natural number, ... GPU N 114 includes $B_N$ vGPUs 120, where $B_N$ is a natural number. In an embodiment, $B_1$, $B_2$, ... $B_N$ have the same value. In another embodiment, any one or more of $B_1$, $B_2$, ... $B_N$ have different values. Thus, the amount of processing resources (via a set of vGPUs) on any GPU in computing system 102 can be different than other GPUs in computing system 100. For example, $B_1$ could be five, $B_2$ could be 10, and $B_N$ could be eight.

GPU scheduler 108 determines an optimal allocation of jobs from job requests 104 to vGPUs. In an embodiment, whenever a new job request is received, GPU scheduler 108 determines a new optimal allocation of jobs to vGPUs, taking into consideration the requirements of the new job and previous allocation of existing jobs to vCPUs. This may result in migrating one or more existing jobs from one physical GPU to another physical GPU. In another embodiment, whenever an existing job is complete, GPU scheduler 108 determines a new optimal allocation of jobs to vGPUs, taking into consideration the requirements of the completed job and allocation of existing jobs to vGPUs. This may also result in migrating one or more jobs from one physical GPU to another physical GPU. By continually reassessing the optimal allocation of jobs to vGPUs in computing system 100, GPU scheduler 108 prevents oversubscription of jobs to GPUs, avoids GPU resource fragmentation, and avoids underutilization of GPU resources. This results in improving the overall performance of computing system 100.

In an embodiment, once GPU scheduler 108 formulates a solution to the problem of optimal GPU allocation into an integer linear programming optimization problem based on input variables, the GPU scheduler sends the formulation to solver 122. Solver 122 determines an optimal solution for the formulation and returns a set of output data (described below) to the GPU scheduler. The output data is used by the GPU scheduler to implement the optimal allocation of jobs to GPUs in computing system 100 (e.g., possibly migrating existing jobs and/or allocating new jobs). In an embodiment, solver 122 is integral with GPU scheduler 108. In another embodiment, solver 122 is executed by computing system 100 but is not integral with GPU scheduler 108. In a further embodiment, solver 122 is executed by a computing system other than computing system 100 (e.g., another computing system accessible over a network (such as the Internet) by GPU scheduler 108). Any suitable integer linear programming solver for solver 122 may be used, such as, the Gurobi optimization toolkit (commercially available from Gurobi Optimization, LLC); the CPLEX Optimizer (commercially available from IBM Corporation); or the linear programming "OR" tool (available as open-source software from Google), etc.

Figure 2:
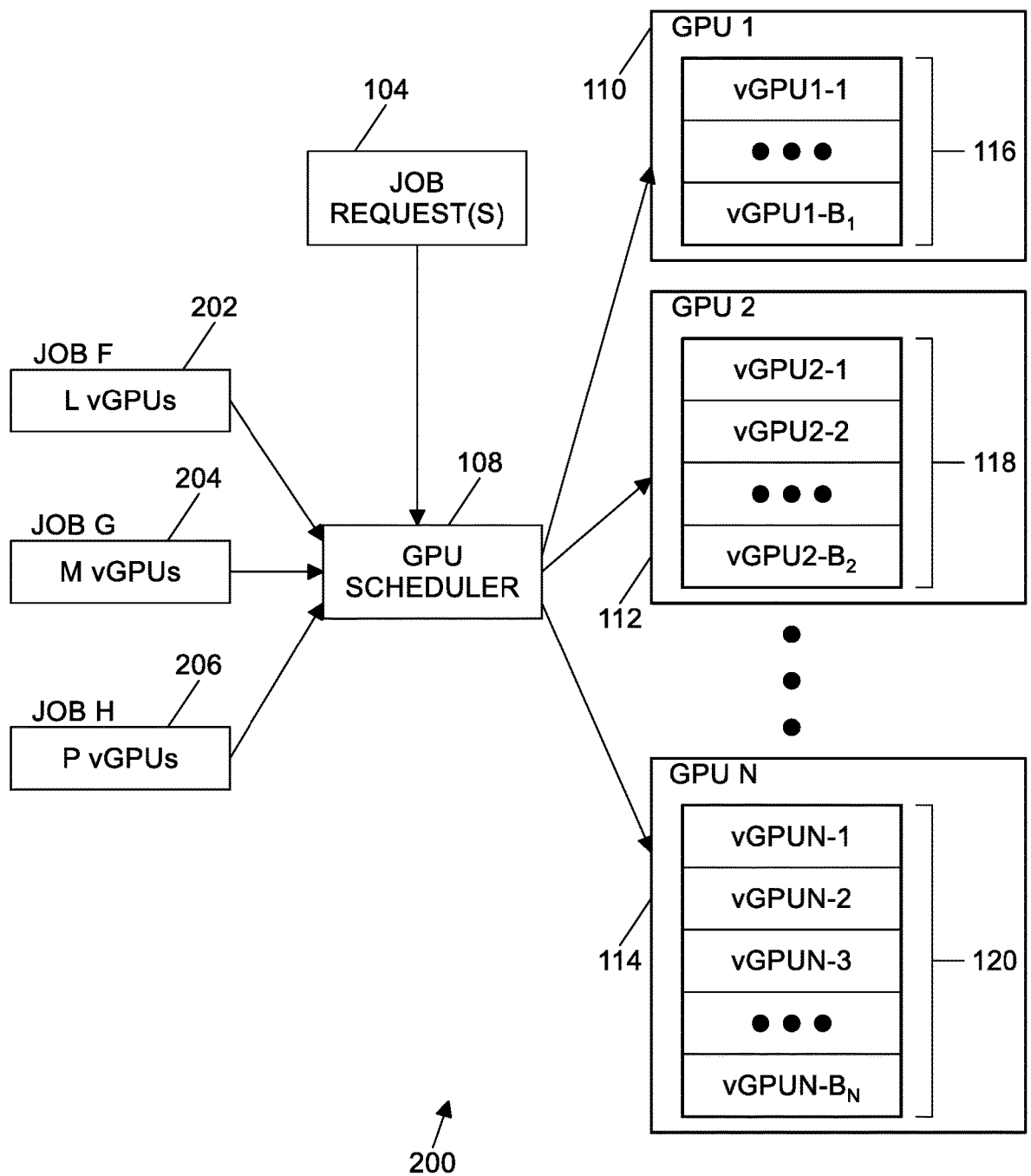
FIG. 2 is a diagram of an example arrangement of jobs and GPUs according to some embodiments.

FIG. 2 is a diagram of an example arrangement 200 of jobs and GPUs according to some embodiments. In this example, consider a computing system having N GPUs, where GPU 1 110 has B1 number of vGPUs 116 denoted vGPU1-1, ... vGPU1-B1 116; GPU 2 112 has B2 number of vGPUs 118 denoted vGPU2-1, vGPU2-2, ... vGPU2-B2 118; and GPU N 110 has BN number of vGPUs 120 denoted vGPUN-1, vGPUN-2, vGPUN-3, ... vGPUN-BN 120, resulting in computing system 100 having B=(B1+B2+ ... +BN) number of vGPUs available for processing jobs. Assume GPU scheduler 108 receives a job request 104 to allocate job F 202 for processing by the GPUs of computing system 100 and assume that job F requires L vGPUs to perform job F, where L is a natural number. It is assumed that the job cannot be allocated to more than one physical GPU. It is assumed that any given job may require more, the same, or less vGPUs than any other job. In a first example invocation of GPU scheduler 108, the GPU scheduler optimally allocates job F 202 to L different vGPUs from the set of vGPUs 116, 118, ... 120 such that the migration cost and operational cost for computing system 102 are minimized, such as in a manner described below with respect to FIG. 3. This may result in some GPUs being unused and powered off. This may result in some vGPUs being unused. After allocation of job F, L vGPUs are in use in the physical GPUs.

Now assume that GPU scheduler 108 receives another job request 104 to allocate job G 204 for processing by the GPUs of computing system 100 and assume that job G requires M vGPUs to perform job G, where M is a natural number. In a second example invocation of GPU scheduler 108, the GPU scheduler optimally allocates job G 204 to M different vGPUs from the set of vGPUs 116, 118, ... 120 such that the migration cost and operational cost for computing system 100 are minimized, such as in a manner described below with respect to FIG. 3. This allocation determination takes into consideration the existing job F 202 and the previously allocated L vGPUs. This may result in some GPUs being unused and powered off. This may result in some vGPUs being unused. This may result in existing job F 202 being performed by a previously allocated physical GPU to be migrated to another physical GPU. After allocation of job F, L+M vGPUs are in use.

Now assume that GPU scheduler 108 receives a job request 104 to allocate job H 206 for processing by the GPUs of computing system 100 and assume that job H requires P vGPUs to perform job H, where P is a natural number. Assume also that job F has completed. In a third example invocation of GPU scheduler 108, the GPU scheduler optimally allocates job H 204 to P different vGPUs from the set of vGPUs 116, 118, . . . 120 such that the migration cost and operational cost for computing system 100 are minimized, such as in a manner described below with respect to FIG. 3. This allocation determination takes into consideration the completion of existing job F 202 and the previously allocated L vGPUs and the existing job G 204 and the previously allocated M vGPUs. This may result in some GPUs being unused and powered off. This may result in some vGPUs being unused. This may result in one or more existing job G 204 being performed by a previously allocated physical GPU to be migrated to another physical GPU, including, for example, the physical GPU formerly used to process job F 202. After allocation of job H 206 and completion of job F 202, M+P vGPUs are in use.

Thus, repeated invocations of GPU scheduler 108 to allocate jobs to vGPUs, whenever a new job request is received or when an existing job completes, results in optimal usage of the GPUs in computing system 100.

Figure 3:
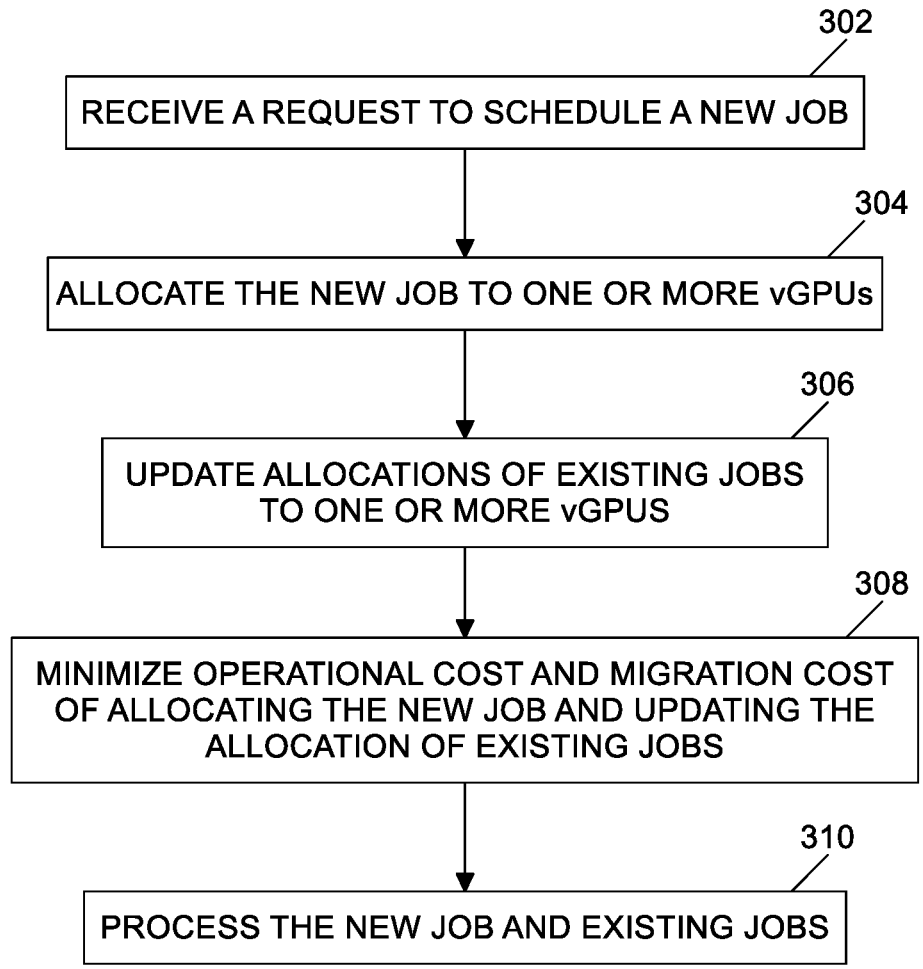
FIG. 3 is a flow diagram of GPU scheduler processing according to some embodiments.

FIG. 3 is a flow diagram of GPU scheduler processing 300 according to some embodiments. For convenience, FIG. 3 will be described with reference to elements of FIG. 1 described above. At block 302, GPU scheduler 108 receives a job request 104 to schedule a new job to be performed by the GPU(s) of computing system 100. At block 304, GPU scheduler 108 allocates the new job to one or more vGPUs. At block 306 GPU scheduler 108 updates the allocations of existing jobs to one or more vGPUs. At block 308, GPU scheduler minimizes the operational cost and migration cost of allocating the new job and updating the allocation of existing jobs to one or more vGPUs. In an embodiment, the allocation of the new job to one or more vGPUs, the update of the allocations of existing jobs to one or more vGPUs, and the minimization of the operational cost and migration cost of allocating the new job and updating the allocation of existing jobs to one or more vGPUs is performed in polynomial time, as will be described below. In an embodiment, performing block 308 is done at least in part by solver 122. At block 310, the allocated vGPUs (and, by extension, the GPUs) of computing system 100 process the new job and the existing jobs.

In an embodiment, the actions of FIG. 3 are performed whenever a new job request is received. In another embodiment, the actions of blocks 304 and 306 are performed whenever an existing job completes (except when there is no new job to be handled in this instance, no new job is allocated or processed, but the allocation of the remaining existing jobs is updated, and the remaining existing jobs are processed). In an other embodiment, the actions of blocks 304, 306, and 308 are performed atomically and simultaneously.

GPU scheduler 108 provides an optimal solution to the GPU scheduling problem. This problem is an instance of a bin packing problem where the bins are constrained (e.g., the minimum size of items in a bin is a constant). For example, a bin can represent a vGPU and an item can represent a job. In a bin packing problem with constraints, the total combination of items in a bin is equal to $$R = \binom{M+K}{M}$$

where K is the number of distinct sizes of bins and M is the number of items. Therefore, the total combination of bins with R different bins is equal to $$P = \binom{n+R}{R} \leq (n+R)^R = O(n^R),$$

which is bounded by a polynomial of n. Therefore, the solution to the GPU scheduling problem as described herein can be solved in polynomial time.

GPU scheduler 108 takes the following variables as input data: 1) The set of jobs (previously allocated and any new job(s) that need to be allocated); 2) The previous allocation decisions $k_{ij}$ $\forall i,j$ of the existing jobs in the system (where $k_{ij}$ is a binary variable that represents the previous decision of allocation of job i to GPU j; 3) The weights $w_i$ $\forall i$; for each job's migration cost; 4) The weights the system administrator chooses for the objective functions $\epsilon_1$, $\epsilon_2$ (where $\epsilon_1$ represents the operational cost and $\epsilon_2$ represents the migration cost); 5) The required number of virtual GPUs $R_i$ $\forall i$; for each job; and 6) The total number N of physical GPUs in the system.

GPU scheduler 108 produces the following variables as output data: (1) The new decision $x_{ij}$ $\forall i,j$ of allocating all jobs (existing and new ones) in the system where $x_{ij}$ represents the decision to allocate job i to GPU j; 2) The number of job migrations and migration cost; 3) The binary decision $\delta_i$ on migrating job i (yes or no); and 4) The binary decision $y_j$ $\forall j$ to power GPU j on or not. GPU scheduler 108 implements the allocations decisions for the jobs and the vGPUs based at least in part on the output data. The GPUs then process the jobs allocated to their vGPUs.

Table 1 lists the input variables and the output variables.

TABLE 1

| Variable | Explanation |
|---|---|
| $\epsilon_1$ | The weight (priority) that the system administrator can choose to give to the first objective function that minimizes the operational cost (the total number of GPUs which are "powered on" translates into operational cost). |
| $\epsilon_2$ | The weight (priority) that the system administrator can choose to give to the second objective function that minimizes the migration cost (the total weighted number of job migrations). |
| $y_j$ | A binary variable that represents the decision to power on GPU j when $y_j$ is 1 or not when $y_j$ is 0. |
| $\delta_i$ | A binary variable that represents the decision to migrate job i when $\delta_i$ is 1 or not when $\delta_i$ is 0. |

TABLE 1-continued

| Variable | Explanation |
|---|---|
| $w_i$ | The weight (priority) that the system administrator can give to different jobs to specify the migration cost in the case that different jobs have different migration costs; for example, job 14 might have two times more data to be moved with respect to job 27 and the administrator can choose $w_{14} = 2\ w_{27}$ to specify the migration costs associated for each job. |
| $R_i$ | An integer variable that shows the number of virtual GPUs required for each job i. |
| $x_{ij}$ | A binary variable that represents the decision to allocate job i to GPU j when $x_{ij}$ is 1 and not to allocate when $x_{ij}$ is 0. |
| $B_j$ | An integer variable defining the number of virtual GPUs that exist in each physical GPU j, which is chosen by the system administrator (depending on how the GPU j is divided into virtual GPUs). |
| $k_{ij}$ | A binary variable that represents the previous decision of allocation of job i to GPU j when $k_{ij}$ is 1 and not allocated when $k_{ij}$ is 0. |
| N | An integer variable defining the total number of physical GPUs in the computing system. |

Equation 1 and constraints 1, 2, 3, and 4 represent a formulation of the GPU allocation problem by GPU scheduler 108 which is sent to solver 122 for processing.

$$\text{Min } \epsilon_1 \sum_j y_j + \epsilon_2 \sum_i w_i \delta_i \quad \text{Equation 1}$$

$$\text{sub} \sum_i R_i \cdot x_{ij} \leq B_j y_j, \forall\ j \in 1, \ldots N \quad \text{Constraint 1}$$

$$\sum_j x_{ij} = 1 \quad \text{Constraint 2}$$

$$\delta_i \geq \frac{\Sigma_j(x_{ij} + k_{ij} - 2x_{ij}k_{ij})}{|N|} \quad \text{Constraint 3}$$

$$\delta_i, x_{ij}, k_{ij} \in \{0,1\} \quad \text{Constraint 4}$$

The objective function of Equation 1 has two parts: (i) the left-hand side shows the operational cost for powering on the GPUs (which are required) in the computing system biased by a constant that shows the priority of operational cost in the objective function; and (ii) the right-hand side shows the weighted migration cost of the jobs. Constraint 1 requires that the number of jobs allocated to a physical GPU cannot be more than the capacity of the physical GPU. Constraint 2 requires that each job can be scheduled on only one of the physical GPUs.

Constraint 3 requires that migration is performed when the new allocation is different from the current allocation by setting the variable $\delta_i$ to 1 in the case of migration and 0 otherwise. This is represented in Table 2.

TABLE 2

| $x_{ij}$ | $k_{ij}$ | $\delta_i$ |
|---|---|---|
| 0 | 0 | 0 |
| 1 | 1 | 0 |
| 0 | 1 | 1 |
| 1 | 0 | 1 |

Constraint 4 requires that $\delta_i$, $x_{ij}$, $k_{ij}$ are binary variables that can be either 0 or 1.

The technology described herein provides a GPU scheduling process to optimally allocate jobs to vGPUs, taking into account operational cost and migration cost. The system administrator has the capability to choose the cost model and can give priority to the operational cost or the migration cost by adjusting their respective weights $w_i$. The system administrator can specify the number of GPUs in the computing system N, the number of vGPUs available, how many vGPUs each physical GPU is divided into B, and the number of vGPUs needed by each job over time $R_i$.

The processing described herein with reference to FIGS. 1 through 5 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computing systems or nodes of various forms, such as the systems described above with reference to FIGS. 1 and 2, or the nodes and/or computing systems described below with reference to FIGS. 4 and 5.

Embodiments described herein include various steps, examples of which have been described above. As described further above, these steps may be performed by hardware components or may be embodied in machine-executable instructions, which may be used to cause a processor programmed with the instructions to perform the steps. Alternatively, at least some steps may be performed by a combination of hardware, software, and/or firmware.

Embodiments described herein may be provided as a computer program product, which may include a tangible machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various embodiments described herein may involve one or more computing elements or computers (or one or more processors within a single computer) and storage systems containing or having network access to computer program(s) coded in accordance with various methods described herein, and the method steps of various embodiments described herein may be accomplished by modules, routines, subroutines, or subparts of a computer program product.

Figure 4:
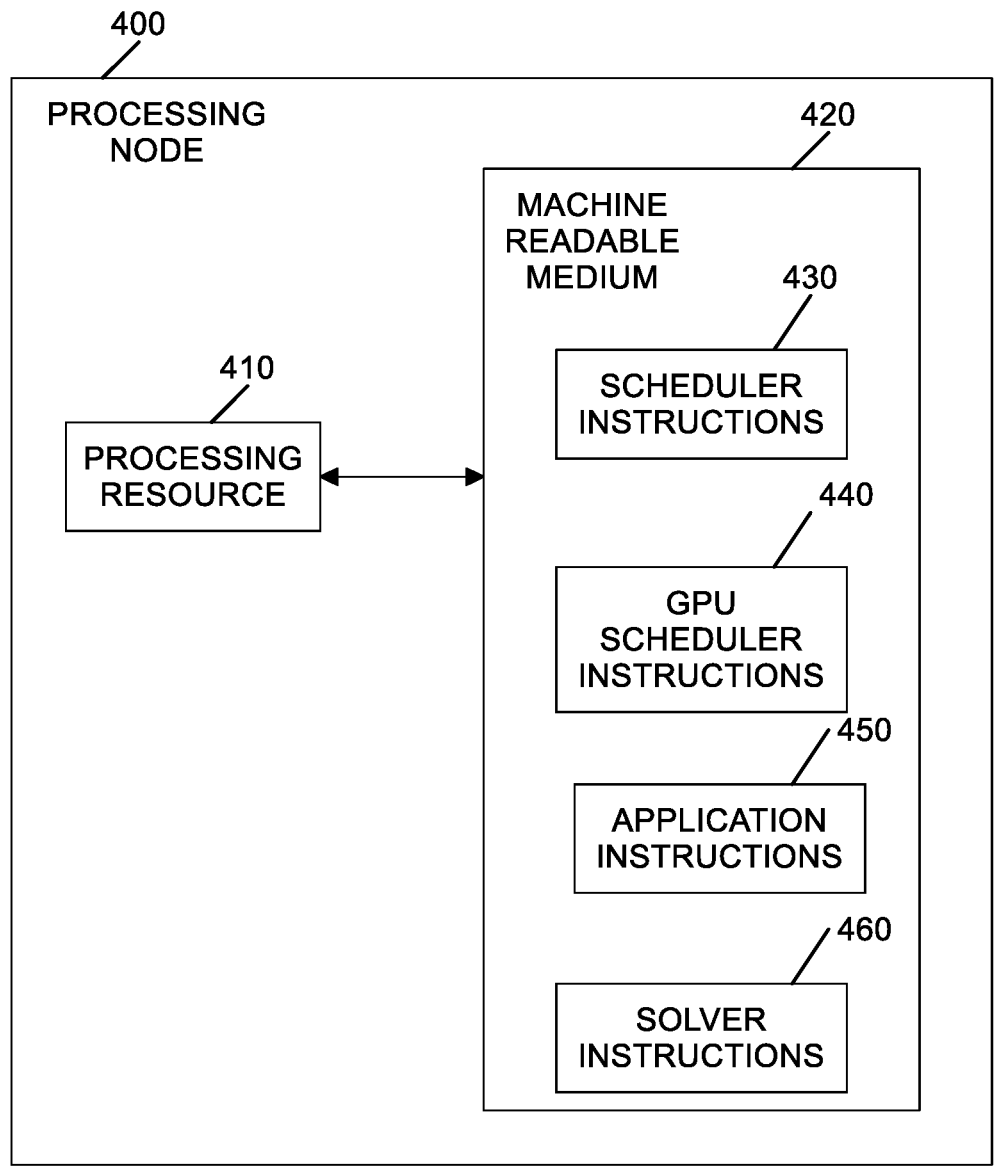
FIG. 4 is a block diagram of a processing node of a distributed computing system in accordance with an embodiment.

FIG. 4 is a block diagram of a processing node 400 of a system (such as computing system 100) in accordance with an example embodiment. In the example illustrated by FIG. 4, node 400 includes a processing resource 410 coupled to a non-transitory, machine-readable medium 420 encoded with instructions to perform scheduling The processing resource 410 may include a microcontroller, a microprocessor, central processing unit (CPU) core(s), a graphic processing unit (GPU), an ASIC, an FPGA, and/or other hardware device suitable for retrieval and/or execution of instructions from the machine readable medium 420 to perform the functions related to various examples described herein. Additionally, or alternatively, the processing resource 410 may include electronic circuitry for performing the functionality of the instructions described herein.

The machine readable medium 420 may be any medium suitable for storing executable instructions. Non-limiting examples of machine readable medium 420 include random-access memory (RAM), read-only memory (ROM), electrically erasable read-only memory (EEPROM), flash memory, a hard disk drive, an optical disc, or the like. The machine readable medium 420 may be disposed within node 400, as shown in FIG. 4, in which case the executable instructions may be deemed "installed" or "embedded" on node 400. Alternatively, the machine readable medium 420 may be a portable (e.g., external) storage medium, and may be part of an "installation package." The instructions stored on the machine readable medium 420 may be useful for implementing at least part of the methods described herein.

As described further herein below, the machine readable medium 420 may have stored thereon a set of executable instructions 430, 440, 450 and 460. It should be understood that part or all of the executable instructions and/or electronic circuits included within one box may, in alternate implementations, be included in a different box shown in the figures or in a different box not shown. In some implementations, the machine-readable medium 420 may include other instructions not shown to perform other functions described herein, such as establishing a write weight or an election timeout.

Instructions 430, upon execution, cause the processing resource 410 to perform scheduler 116 processing. In an embodiment, scheduler processing includes executing, by a processing resource on computing system 100, a process to allocate job requests to computing resources within computing system 100 (e.g., such as CPUs, ASICs, FPGAs, etc.). Scheduler instructions 430 call GPU scheduler instructions 440. Instructions 440, upon execution, cause the processing resource 410 to perform GPU scheduler processing. In an embodiment, GPU scheduler processing includes executing, by a processing resource on computing system 100, a process to optimally allocate jobs to GPUs within computing system 100. Instructions 450, upon execution, cause the processing resource 410 to perform application 100 processing. In an embodiment, application 102 processing includes any desired data processing as directed by a user of the application. Execution of application instructions 450 result in calls to scheduler instructions 430. GPU scheduler instructions 440 call solver instructions 460. Instructions 460, upon execution, cause the processing resource 410 to perform solver processing (e.g., generate a solution to the linear program problem of GPU allocation).

Figure 5:
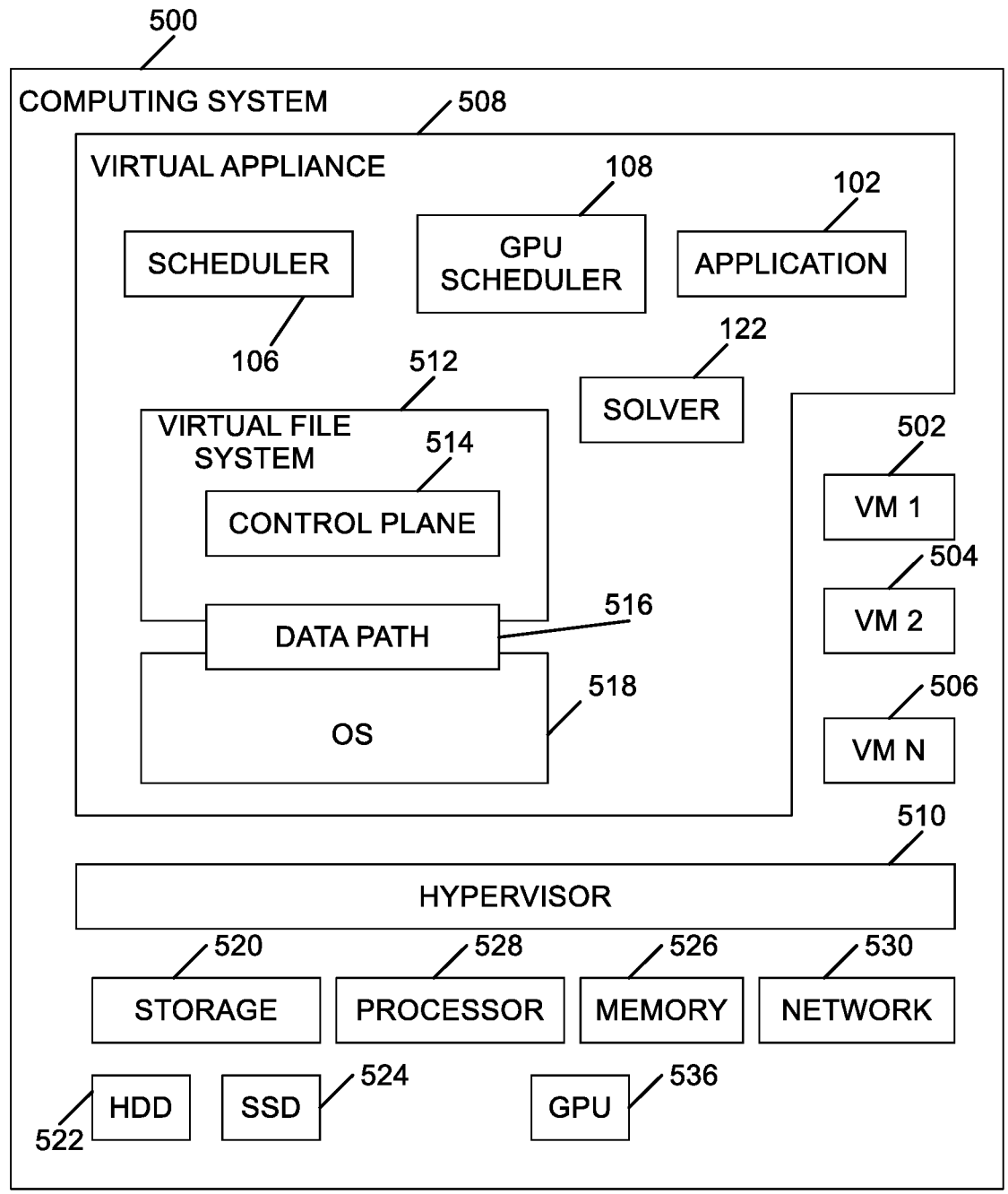
FIG. 5 is a block diagram illustrating a processing node of a distributed computing system in accordance with an embodiment.

FIG. 5 is a block diagram illustrating a node 500 that may represent the nodes of a system (such as computing system 100) in accordance with an embodiment. In the context of the present example, node 500 has a software-centric architecture that integrates compute, storage, networking and virtualization resources and other technologies.

Node 500 may be implemented as a physical server (e.g., a server having an x86 or ARM architecture) or other suitable computing device. In the present example, node 500 hosts a number n of guest virtual machines (VM) 502, 504 and 506 (n being a natural number) and can be configured to perform GPU scheduling as described herein. In some embodiments, multiple of such nodes, each performing scheduler 106, GPU scheduler 108, and application 102 processing (such as that described above in connection with FIGS. 1 through 4), may be coupled to a network and configured as part of a cluster. Depending upon the particular implementation, one or more services supported by the system may be related to VMs 502, 504 and 506 or may be unrelated.

Node 500 can include a virtual appliance 508 above a hypervisor 510. Virtual appliance 508 can include scheduler 106, GPU scheduler 108, solver 122, and application 102. Virtual appliance 508 can include a virtual file system 512 in communication with a control plane 514 and a data path 516. Control plane 514 can handle data flow between applications and resources within node 500. Data path 516 can provide a suitable Input/Output (I/O) interface between virtual file system 512 and an operating system (OS) 518. In one embodiment, scheduler 106 and GPU scheduler 108 are integral with OS 518. According to one embodiment the virtual appliance 508 represents a virtual controller configured to run storage stack software (not shown) that may be used to perform functions such as managing access by VMs 502, 504 and 506 to storage 520, providing dynamic resource sharing, moving VM data between storage resources 522 and 524, providing data movement, and/or performing other hyperconverged data center functions.

Node 500 can also include a number of hardware components below hypervisor 510. For example, node 500 can include storage 520 which can be Redundant Array of Independent Disks (RAID) storage having a number of hard disk drives (HDDs) 522 and/or solid-state drives (SSDs) 524. Node 500 can also include memory 526 (e.g., random-access memory (RAM), read-only memory (ROM), flash, etc.) and one or more processors 528. Node 500 can include wireless and/or wired network interface components to enable communication over a network 530 (e.g., with other nodes or with the Internet). Node 500 can also include one or more GPUs 536.

In the foregoing description, numerous details are set forth to provide an understanding of the subject matter disclosed herein. However, implementation may be practiced without some or all these details. Other implementations may include modifications and variations from the details discussed above. It is intended that the following claims cover such modifications and variations.

What is claimed is:

1. A method comprising:
receiving, in a computing system comprising graphics processing units (GPUs) on which are provided a plurality of virtual GPUs (vGPUs), a request to schedule a new job to be executed by the computing system, the request being received at a time when one or more existing jobs are already being processed by one or more vGPUs to which the one or more existing jobs were previously allocated from among the plurality of vGPUs; and as a response to receiving the request to schedule the new job:

determining, by the computing system, an updated set of job allocations that minimizes a cost function, wherein the updated set of job allocations comprises a new allocation for the new job and an updated allocation for the one or more existing jobs, and wherein the cost function comprises a job migration cost component including a variable representing a decision to migrate a first existing job from a first GPU to a different second GPU, and allocating, by the computing system, the new job and the one or more existing jobs to vGPUs of the plurality of vGPUs according to the updated set of job allocations; and processing the new job and the one or more existing jobs by the vGPUs to which the new job and the one or more existing jobs have been allocated.

2. The method of claim 1, wherein the GPUs of the computing system are heterogeneous GPUs.

3. The method of claim 1, wherein the updated set of job allocations comprises an allocation of the new job to a vGPU that is currently processing one of the one or more existing jobs.

4. The method of claim 1, wherein the updated set of allocations comprises an allocation of the first existing job to the second GPU that is different from the first GPU currently processing the first existing job.

5. The method of claim 1, wherein the job migration cost component further comprises a weight assigned to the first existing job based on an amount of data associated with the first existing job.

6. The method of claim 5, wherein the weight is multiplied to the variable to form the job migration cost component.

7. The method of claim 1, wherein the cost function further comprises a GPU operational cost component indicative of a cost of operating the GPUs.

8. The method of claim 7, wherein the GPU operational cost component comprises a variable representing a decision to power on a GPU.

9. The method of claim 7, wherein the GPU operational cost component comprises a first set of configurable weights, and the job migration cost component comprises a second set of configurable weights, and the method further comprises receiving an input to configure the first and second sets of configurable weights.

10. The method of claim 7, wherein the determining of the updated set of job allocations that minimizes the cost function comprises minimizing the cost function subject to at least the following constraints: a number of jobs allocated to a GPU cannot be more than a capacity of the GPU; a job can be scheduled on only one GPU; and migration of the first existing job is performed when the updated allocation of the first existing job is different than a current allocation of the first existing job.

11. The method of claim 1, wherein the variable when set to a first value represents a decision to migrate the first existing job from the first GPU to the second GPU, and the variable when set to a second value represents a decision to not migrate the first existing job from the first GPU to the second GPU.

12. A non-transitory machine-readable storage medium comprising instructions that, when executed by a processing resource, cause the processing resource to:

receive, in a computing system comprising graphics processing units (GPUs) on which are provided a plurality of virtual GPUs (vGPUs), a request to schedule a new job to be executed by the computing system, the request being received at a time when one or more existing jobs are already being processed by one or more vGPUs to which the one or more existing jobs were previously allocated from among the plurality of vGPUs; and in response to receiving the request to schedule the new job:

determine an updated set of job allocations that minimizes a cost function, wherein the updated set of job allocations comprises a new allocation for the new job and an updated allocation for the one or more existing jobs, and wherein the cost function comprises a job migration cost component including a variable representing a decision to migrate a first existing job from a first GPU to a different second GPU; and allocate the new job and the one or more existing jobs to vGPUs of the plurality of vGPUs according to the updated set of job allocations; and process the new job and the one or more existing jobs by the vGPUs to which the new job and the one or more existing jobs have been allocated.

13. The non-transitory machine-readable storage medium of claim 12, wherein the job migration cost component further comprises a weight assigned to the first existing job based on an amount of data associated with the first existing job.

14. The non-transitory machine-readable storage medium of claim 13, wherein the weight is multiplied to the variable to form the job migration cost component.

15. The non-transitory machine-readable storage medium of claim 12, wherein the cost function further comprises a GPU operational cost component indicative of a cost of operating the GPUs, and wherein the determining of the updated set of job allocations that minimizes the cost function comprises minimizing the cost function subject to at least the following constraints: a number of jobs allocated to a GPU cannot be more than a capacity of the GPU; a job can be scheduled on only one GPU; and migration of the first existing job is performed when an updated allocation of the first existing job is different than a current allocation of the first existing job.

16. The non-transitory machine-readable storage medium of claim 15, wherein the GPU operational cost component comprises a variable representing a decision to power on a GPU.

17. A computing system comprising:

graphics processing units (GPUs) on which are provided a plurality of virtual GPUs (vGPUs);

a hardware processor; and a non-transitory storage medium storing GPU scheduling instructions executable on the hardware processor to:

receive a request to schedule a new job to be executed by the computing system, the request being received at a time when one or more existing jobs are already being processed by one or more vGPUs to which the one or more existing jobs were previously allocated from among the plurality of vGPUs; and in response to receiving the request to schedule the new job:

determine an updated set of job allocations that minimizes a cost function, wherein the updated set of job allocations comprises a new allocation for the new job and an updated allocation for the one or more existing jobs, and wherein the cost function comprises a job migration cost component including a variable representing a decision to migrate a first existing job from a first GPU to a different second GPU, allocate the new job and the one or more existing jobs to vGPUs of the plurality of vGPUs according to the updated set of job allocations; and process the new job and the one or more existing jobs by the vGPUs to which the new job and the one or more existing jobs have been allocated.

18. The computing system of claim 17, wherein the job migration cost component further comprises a weight assigned to the first existing job based on an amount of data associated with the first existing job.

19. The computing system of claim 18, wherein the weight is multiplied to the variable to form the job migration cost component.

20. The computing system of claim 19, wherein the cost function further comprises a GPU operational cost component indicative of a cost of operating the GPUs, and wherein the determining of the updated set of job allocations that minimizes the cost function comprises minimizing the cost function subject to at least the following constraints: a number of jobs allocated to a GPU cannot be more than a capacity of the GPU; a job can be scheduled on only one GPU; and migration of the first existing job is performed when an updated allocation of the first existing job is different than a current allocation of the first existing job.

* * * * *